United States Patent
Barkowsky et al.

(10) Patent No.: US 8,844,296 B2
(45) Date of Patent: Sep. 30, 2014

(54) MAIN ENGINE START BY MEANS OF AN AIRCRAFT AIR CONDITIONING SYSTEM

(71) Applicant: Airbus Operations GmbH, Hamburg (DE)

(72) Inventors: Jan Barkowsky, Schwerin (DE); Jan Dittmar, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/788,656

(22) Filed: Mar. 7, 2013

(65) Prior Publication Data
US 2013/0199201 A1    Aug. 8, 2013

Related U.S. Application Data

(63) Continuation of application No. PCT/EP2011/067563, filed on Oct. 7, 2011.

(60) Provisional application No. 61/391,243, filed on Oct. 8, 2010.

(30) Foreign Application Priority Data

Oct. 8, 2010 (DE) .......................... 10 2010 047 971

(51) Int. Cl.
*F02C 7/26* (2006.01)
*F02C 6/08* (2006.01)
*B64D 13/06* (2006.01)

(52) U.S. Cl.
CPC ........... *F02C 7/26* (2013.01); *B64D 2013/0696* (2013.01); *B64D 13/06* (2013.01)

USPC .................................. 60/778; 60/782; 60/786

(58) Field of Classification Search
USPC .......... 60/39.15, 778, 782, 785, 787, 788, 786
See application file for complete search history.

(56) References Cited

U.S. PATENT DOCUMENTS 2,777,301 A * 1/1957 Kuhn .............................. 62/178
3,965,673 A * 6/1976 Friedrich ........................ 60/788

(Continued)

FOREIGN PATENT DOCUMENTS

GB         1467681 A       3/1977

OTHER PUBLICATIONS

German Patent Office, German Office Action dated Dec. 16, 2011 for German Patent Application No. 102010047971.3.

(Continued)

*Primary Examiner* — Gerald L Sung
*Assistant Examiner* — Scott Walthour
(74) *Attorney, Agent, or Firm* — Ingrassia Fisher & Lorenz, P.C.

(57) ABSTRACT

An air conditioning system in an aircraft is provided. The system comprises at least one air cycle air-conditioning pack with a compressor comprising a bleed air outlet and with a compressed-air line connected to the bleed air connection, which compressed-air line is connectable to a starter turbine for a main engine. With the use of air from a compressor of an air conditioning pack it is not necessary to switch off the air conditioning pack; bleed air removal from the auxiliary power units becomes obsolete; and, since there is no unnecessary discharge of compressed air from a bleed air system, noise pollution on the ground is reduced.

12 Claims, 3 Drawing Sheets

(56) References Cited

U.S. PATENT DOCUMENTS

| | | | |
|---|---|---|---|
| 4,514,976 A * | 5/1985 | Christoff | 60/785 |
| 4,684,081 A * | 8/1987 | Cronin | 244/58 |
| 5,125,597 A * | 6/1992 | Coffinberry | 244/118.5 |
| 6,634,596 B2 | 10/2003 | Albero et al. | |
| 7,624,592 B2 | 12/2009 | Lui et al. | |
| 7,950,606 B2 | 5/2011 | Atkey et al. | |
| 2002/0162914 A1 * | 11/2002 | Albero et al. | 244/53 R |
| 2007/0267540 A1 * | 11/2007 | Atkey et al. | 244/58 |
| 2008/0001026 A1 | 1/2008 | Hoffjann et al. | |
| 2011/0138822 A1 | 6/2011 | Dittmar et al. | |

OTHER PUBLICATIONS

International Searching Authority, International Search Report dated Feb. 3, 2012 for International Application No. PCT/EP2011/067563.

* cited by examiner

MAIN ENGINE START BY MEANS OF AN AIRCRAFT AIR CONDITIONING SYSTEM

CROSS-REFERENCE TO RELATED APPLICATIONS

This is a continuation of International Application No. PCT/EP2011/067563, filed on Oct. 7, 2011, which claims priority to German Patent Application No. 10 2010 047 971.3, filed on Oct. 8, 2010, and to U.S. Provisional Patent Application No. 61/391,243, filed on Oct. 8, 2010, which are incorporated herein by reference in their entirety.

TECHNICAL FIELD

The technical field relates to an air conditioning system for an aircraft, to an engine start system for an aircraft, to a method for starting an engine of an aircraft, and to the use of compressed air from an air conditioning pack for starting an aircraft engine.

BACKGROUND

Depending on the size and design of an aircraft, engine start systems differ from each other in their design. Smaller engines, for example turboprop engines for regional aircraft, turboshaft engines for helicopters, or piston engines for smaller aircraft are presently preferably started electrically, wherein the electrical power is taken from a battery. Medium-sized and large aircraft that comprise turbojet engines predominantly use a pneumatic system for starting the main engines. In this process, compressed outside air is fed to a starter turbine which consequently rotates, thus producing a mechanical shaft output that by way of a gear arrangement is transmitted to a main shaft of the engine to be started. This process is maintained until after ignition in combustion chambers the engine independently accelerates to operating speed. The pneumatic energy required for starting is provided by bleed air, for example from an auxiliary gas turbine, from some other already started engine, or from external ground equipment, and is fed to the starter turbine by way of a bleed-air distribution system. Before and after engine start the bleed air is predominantly made available to air conditioning packs of an air conditioning system of the aircraft.

In aircraft which provide for increased utilization of electrical energy for operating systems, and thus provide less or no utilization of bleed air when compared to aircraft that are presently in widespread use, starting the engine is typically achieved by means of electrical energy. For this purpose either electrical starter motors or alternatively combined starter/generators are provided on the main engine. In this setup, too, the shaft output is applied, by way of a gear arrangement with a particular transmission ratio, to an engine main shaft. The electrical energy is provided by means of generators of the auxiliary gas turbine, by means of another engine already in operation, or by means of external ground equipment, with the electrical energy being conveyed to the electrical starter by way of the electrical network of the aircraft.

EP 1 817 231 A2 and US 20080001026 A1 describe a supply system for an aircraft, in which engine start takes place by means of electrical energy provided by a fuel cell.

In addition, other objects, desirable features and characteristics will become apparent from the subsequent summary and detailed description, and the appended claims, taken in conjunction with the accompanying drawings and this background.

SUMMARY

Pneumatic start systems for main engines of aircraft may be associated with a disadvantage in that integration of the auxiliary gas turbine that typically takes place in the rear fuselage, and integration of main engines on the wing halves result in very long transmission paths of the bleed air removed from the auxiliary gas turbine, and consequently considerable output for engine start is lost as a result of pressure loss. Since, furthermore, the bleed air necessary for engine start is conveyed through the bleed air system designed for operating the air conditioning system, moreover, air flows through components such as valves or heat exchangers that are not necessary for the start function and thus cause further unnecessary pressure loss.

Furthermore, an auxiliary gas turbine of an aircraft is typically dimensioned for operation of the air conditioning system on the ground. Consequently, typically, high operating pressures are necessary for the pneumatic drive of a bleed-air-based air conditioning system. However, starting main engines requires a fundamentally different operating point, which while also involving high pressure at the same time also requires low mass flows. In order to be able to remove from the auxiliary gas turbine bleed air with such a state, part of the bleed air removed from the main engine needs to be discharged to the aircraft environment. On the one hand this results in economically disadvantageous operation, and on the other hand as a result of discharging part of the bleed air, the noise of the auxiliary gas turbine, which noise is emitted to the environment, is significantly increased.

While synchronously starting several engines would avoid the need to discharge bleed air to the environment of the aircraft, with a design of the auxiliary gas turbine for operating the air conditioning system in wide ranges of ambient temperatures or geographic altitudes of the airport, most of the time this is not possible because the required pressure would increase once again, and it would no longer be possible for the compressor of the auxiliary gas turbine to produce the increased mass flow requirements for several engines.

A pneumatic start with external ground equipment requires corresponding pneumatic devices whose rental from an airport causes considerable expenditure to aircraft operators, and consequently external ground equipment is typically used only if an auxiliary gas turbine fails.

Electrical start systems are associated with a disadvantage in that they, too, result in line loss due to long transmission paths from the auxiliary gas turbine to the engine start system. When compared to pneumatic start systems, some of the electrical energy, for the purpose of transmission and operation of the starter, additionally needs to be converted to other frequencies and voltage forms. In an exemplary embodiment of the start system as a starter/generator, the latter is technically more complex than a present-day generator. In an exemplary embodiment as a starter motor the latter is heavier than a pneumatic turbine starter, and requires an additional electrical network.

It may thus be desirable to provide an engine start system that as effectively as possible and without incurring substantial power losses in a particularly economical manner and with little noise development can carry out an engine start.

The air conditioning system according to the present disclosure comprises at least one air conditioning pack based on an air cycle method, with a compressor and a compressed-air line connected to the compressor. The compressed-air line is connectable to a starter turbine for a main engine.

Based on the operating principle of the air cycle method the air conditioning pack of the air conditioning system comprises a compressor which for the purpose of supplying air to a passenger cabin compresses outside air that is intercooled and relaxed in one or several turbine stages. The compressor can be electrically operable. It is the aim of the air conditioning system according to the present disclosure, apart from the primary task of providing air conditioned air, to also make it possible to start engines, because air cycle air-conditioning packs are designed to provide compressed air that can be used as an energy source for a pneumatic starter turbine. It is the underlying idea for the compressed outside air of an air conditioning pack put into operation downstream of the compressor during initiation of the starting procedure temporarily not to be fed to a further cooling process for air conditioning a passenger cabin, but instead to temporarily convey it onwards, by way of a compressed-air line, to a starter turbine.

In a typical design of an air conditioning system of an aircraft, for example two air conditioning packs are used which are located in two fuselage halves of the aircraft. Each of these two would be able to start a main engine of the aircraft. To this effect, compressed-air lines would extend from the air conditioning packs to the engines to be started, which engines are located in the two associated wing halves. In this manner an air conditioning system according to the present disclosure provides the aircraft with the ability for two engines to be started simultaneously, basically without any restrictions by ambient conditions.

The air conditioning system according to the present disclosure provides an advantage in that the pneumatic engine start can be applied independently of the type of the primary energy supply on board an aircraft. Thus even for a primary electrical energy supply this proven principle can be used. For a primary electrical energy supply on the one hand the disadvantage of electrical starter motors or starter generators is circumvented. Starter motors are heavy when compared to pneumatic starters. While starter generators do not represent an additional component, as a result of their design relating to these two fields of operation they are more complex and heavier than present-day generators. Furthermore, unlike common practice at present it is not necessary to switch off the entire air conditioning pack to carry out engine start. Although only one motorized compressor is used for engine start, and the downstream systems are shut down, in return the motorized compressor is less often subjected to mechanical loads as a result of shutting down and starting up. This has a positive effect on the service life of this component.

In one exemplary embodiment the air conditioning system according to the present disclosure comprises a start valve and at least one air conditioning valve, wherein the start valve is equipped to feed compressed air from the compressed-air line to the starter turbine. In contrast to this, the air conditioning valve is equipped to channel compressed air from the compressed-air line to an intermediate cooling device for passing through the air cycle system for supplying the cabin. This makes it possible to implement a leaner design of the compressor, which during engine start supplies pneumatic output exclusively to the starter turbine while the cooling function of the air conditioning pack is temporarily switched off.

In one exemplary embodiment the air conditioning system according to the present disclosure comprises two or more air conditioning packs, wherein their compressed-air lines to the starter turbines are interconnected so that in the case of failure of an air conditioning pack it is possible to start engines on both halves of the wing, even with air conditioning packs that are not primarily intended for this purpose.

In one exemplary embodiment of the air conditioning system according to the present disclosure a bleed air system of one or several engines is connected to the compressed-air line of the air conditioning pack. This makes it possible to more quickly recommence the cooling process of the air conditioning pack because following the start of an engine the feeding-in of bleed air for starting other engines can be carried out by the already started engine. Thus by means of the above-mentioned switching valve the air line may be separated from the compressor of the air conditioning pack as soon as an engine has already reached its operating speed.

In one exemplary embodiment a valve is provided for interrupting a connecting line between the compressed-air lines of several air conditioning packs in order to optionally make it possible, during malfunctions or reduced operation of the air conditioning system, to start engines on a wing half that does not correlate to the fuselage half in which the air conditioning pack concerned is arranged.

In one exemplary embodiment a pressure control valve is positioned in the compressed-air line and upstream the starter turbine for limiting the pressure in the compressed-air line. Thereby, an overpressure in the turbine and/or the compressed-air line can be prevented. Hence, the reliability of the air conditioning system is increased.

For pneumatic engine start it is, furthermore, possible to better control dynamic effects when overcoming the resistance moment of the started engine shaft on the start system. A start by electrical motors directly on the engine shaft is characterized by high torques and peak currents resulting thereof, above all in the initial phase of engine start. During pneumatic starting, as a result of the decoupling by way of a pneumatic distribution system, a reduction in electrical load peaks is possible. This can, for example, take place by discharging air downstream of the compressor to the access side. In this manner the rotational speeds and resulting supply currents can be kept within a smaller range.

As a result of the purely electrical primary energy supply it is possible to design an auxiliary gas turbine or some other auxiliary power unit in a simpler manner because the presently used bleed air system can then be done without. In addition, the principle described makes it possible to use a fuel cell. For engine start with external ground equipment it is possible to fall back on more economical electrical units (mobile or stationary) that furthermore are easier to handle by ground staff.

The present disclosure also provides an engine start system. The engine start system for an aircraft, according to the present disclosure, comprises a starter turbine, a compressed-air line connectable to a compressor of an air conditioning pack based on an air cycle method, an air conditioning valve for interrupting the connection between the compressed-air line and a cabin air supply, and a start valve for interrupting a connection between the compressed-air line and the starter turbine. The above mentioned additional features may furthermore be added to the engine start system according to the present disclosure in order to achieve the related advantages.

Furthermore, a method for starting an engine of an aircraft is provided according to various exemplary embodiments, which method substantially comprises closing an air conditioning valve that separates the output of a compressor of an air conditioning pack from a delivery air inlet for a cabin; opening a start valve that connects the output of the compressor to a starter turbine; starting the engine by conveying compressed air from the compressor to the starter turbine; and, when the engine has reached an operating speed, closing the start valve and opening the air conditioning valve.

Finally, the present disclosure provides the use of compressed air from a compressor of an air conditioning pack of an air conditioning system of an aircraft for starting an aircraft engine.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
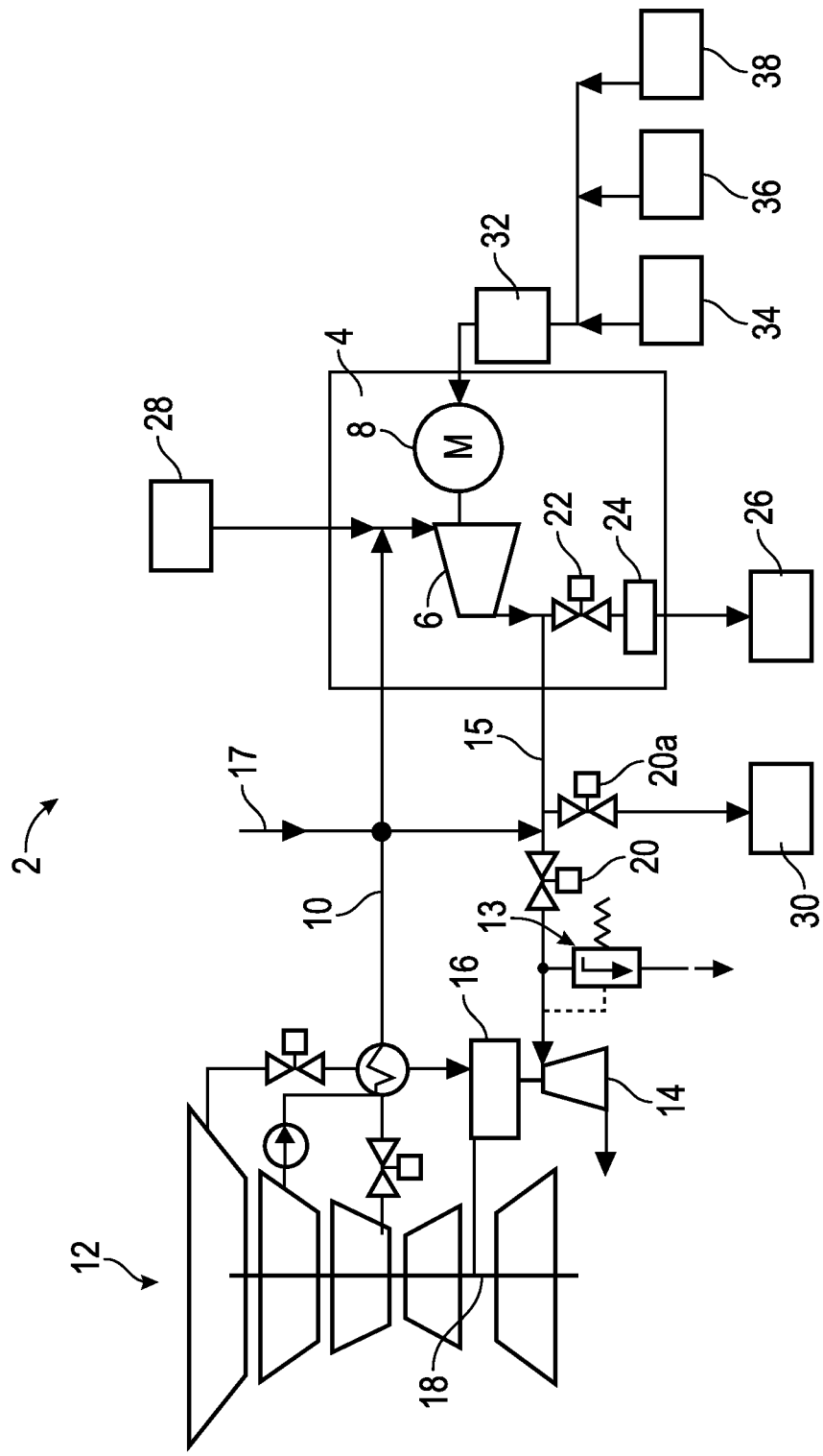
FIG. 1 shows a diagrammatic block-based view of an exemplary embodiment of the air conditioning system according to the various teachings of the present disclosure.

FIG. 1 shows part of an air conditioning system 2 according to the present disclosure, which air conditioning system 2 comprises an air conditioning pack 4 based on an air cycle, which air conditioning pack 4 comprises a compressor 6 that can be driven by an electric motor 8. In flight, with the engines started, the air supply is implemented by means of bleed air, which by way of a bleed air system 10 is removed from one or several compressor stages of one or several engines 12. The detailed design of the bleed air system 10 is of no importance in the context of the present disclosure, provided it is suitable to supply an adequate quantity of bleed air from one or several installed engines of the aircraft in order to be compressed in the compressor 6. Only symbolically displayed is a further (bleed) air source 17, shown in FIG. 1, which is representative for all the imaginable (bleed) air sources within the aircraft.

The part of the air conditioning system 2 according to the present disclosure, which part is shown in FIG. 1, can be complemented, for completeness, by a further air conditioning pack 4. Both air conditioning packs 4 may then, for example, be installed in two different fuselage halves where they may obtain bleed air from the engines 12 of the associated wing halves.

The air conditioning system 2 according to the present disclosure is primarily designed to pressurize and refrigerate fresh air. The secondary function, which characterizes the air conditioning system 2 according to the present disclosure, includes the ability to provide compressed air by means of the compressor 6 to a starter turbine 14 by means of a compressed-air line 15, wherein the starter turbine 14 is connected to a shaft 18 of the engine 12 by way of a gear arrangement 16. In order to carry out this function a valve arrangement with a start valve 20 and an air conditioning valve 22 is used. If starting the engine 12 is to be carried out, the air conditioning valve 22 is to be closed so that the primary function of the air conditioning system 2 temporarily ceases, and the flow through an intermediate cooler 24 and the flow into a cabin 26 is prevented. Instead, the start valve 20 is opened so that the entire air pressure produced by the compressor 6 is applied to the starter turbine 14, causes the latter to rotate, and when the compressed air flows through and over the gear arrangement 16 continuously drives the shaft 18 of the engine 12. As soon as the rotational speed of the engine is within an operating range that makes possible independent further starting, the start valve 20 can be closed, and the air conditioning valve 22 can be re-opened so that the primary function of the air conditioning system 2, namely air conditioning the cabin 26, can be provided again.

As long as none of the engines 12 of the aircraft has been started, no bleed air is available as an air source in the air conditioning system 2 according to the present disclosure, and consequently no bleed-air based engine start is possible. For this purpose the compressor 6 can additionally be coupled to an air intake 28 which can, for example, be situated in an outer skin of the aircraft, and which provides fresh air from the environment. The air intake 28 can either be an air intake aperture designed for ground operation, or, alternatively, can be situated in a ram air duct, wherein during the flight the air intake 28 is generally closed. The provided ambient air is compressed by the compressor 6 and is used for air conditioning the aircraft on the ground or for starting the engine 12. In order to relieve the compressor 6, in addition a fan (not shown) can be used in order to feed ambient air to the air conditioning system 2.

In the exemplary embodiment shown, the bleed air system 10 is connectable to the compressed-air line 15 so that bleed air for engine start can be used as soon as another engine 12 has already been started. Advantageously, a suitable feed-in position for bleed air is located in the direction of flow upstream of the starter valve 20 in order to implement separation from the bleed air system 10 when not in use.

For preventing overpressure in the compressed-air line 15 and/or the turbine 14 a pressure control valve 13 is exemplarily integrated into the air conditioning system 2. Generally, it is positioned in the compressed-air line upstream from the starter turbine 14. When a pressure threshold, which e.g. is adjustable, is exceeded the pressure control valve 13 is opened to release the pressure inside the pressurized-air line and air may be discharged to the environment or systems/apparatuses that may benefit from an additional air supply. Thereby a potential danger is eliminated and the overall reliability of the air conditioning system 2 is increased.

According to FIG. 1 the compressed-air lines 15 of several air conditioning packs 4 are interconnected by way of a connecting line 30 so that any glitches in an air conditioning pack 4 in one fuselage half do not result in the preclusion of starting an engine 12 in the respective wing half when a bleed air source from the other fuselage half can take over the supply to the starter turbine 14. In order to interrupt the connection, a valve 20a is used, which should be used only when the connecting line for starting an engine 12 is absolutely essential. In this setup the feed-in position for bleed air from the bleed air system 10 is generally arranged between the start valve 20 and the valve 20a upstream of the connecting line 30 so that it becomes possible to start an engine 12 on the other wing half without bleed air being applied to the starter turbine 14 from its own wing half.

For the sake of completeness it should be mentioned that the electric motor 8 that drives the compressor 6 is operated on an electrical network 32 that can be supplied with electrical current from various sources. This includes, for example, generators 34 of an auxiliary gas turbine, generators 36 of an already running engine and of a ground supply device 38. In this manner it is possible to carry out an engine start not only without resorting to a running auxiliary gas turbine, but also without participation of an already started engine 12.

The particular advantages of the air conditioning system 12 according to the present disclosure include the movable components of the air conditioning pack 4 not having to be switched off completely prior to the start, but instead at least the compressor 6 being able to be operated without interruption. By switching the valves 20, 22 and 20a, redirection of the compressed air for the purpose of the engine start takes place, and after successful start regular operation of the air conditioning pack 4 is quickly made possible again.

It should be pointed out that in FIG. 1 the aspect of the actual supply of fresh air to a passenger cabin is shown only in a very diagrammatic manner. The figure should not be interpreted as showing that compressed air is fed directly to a passenger cabin. Instead, air conditioning systems of larger commercial aircraft commonly use so-called mixing chambers in which conditioned and pressurized fresh air is mixed with spent air from the passenger cabin before subsequently being fed to the passenger cabin again. However, this aspect is known to the average person skilled in the art and is thus not shown in detail.

Figure 2:
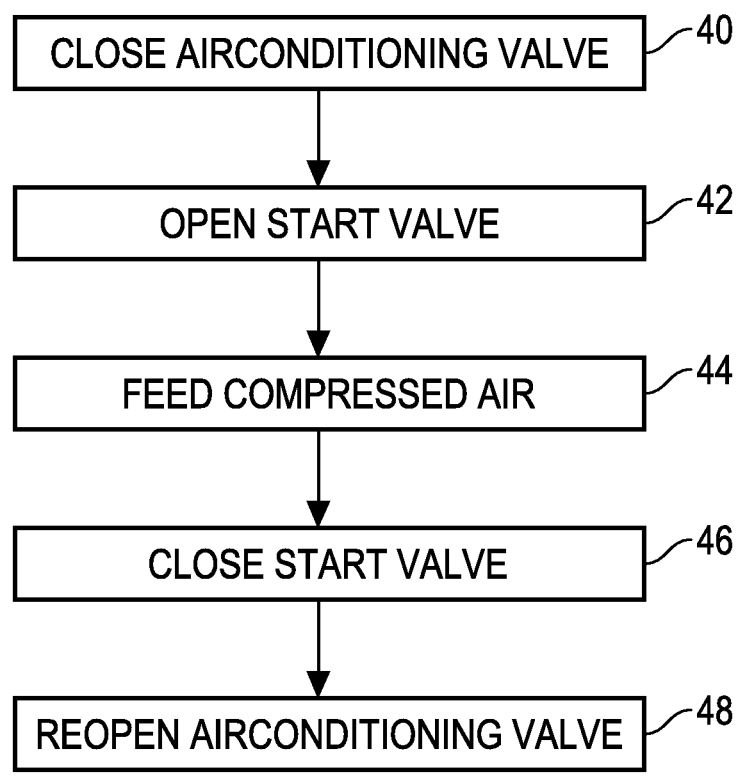
FIG. 2 shows a diagrammatic view of a method according to the various teachings of the present disclosure.

FIG. 2 diagrammatically shows the sequence of the method according to one exemplary embodiment of the present disclosure. For starting an engine 12 the air conditioning valve 22, which separates the output of a compressor 6 of an air conditioning pack 4 with a delivery air inlet for a cabin 26, is closed 40. Subsequently a start valve 20, which connects the output of the compressor 4 to a starter turbine 14, is opened 42. By feeding 44 compressed air by way of a compressed-air line 15 from the compressor 6 to the starter turbine 14, the engine 12 is started. After the operating speed has been reached, the start valve 20 is closed 46 and the air conditioning valve 22 is reopened 48 so that the air conditioning pack can again handle the task of air conditioning the cabin 26. In addition, prior to the start a connecting line can be opened by means of a valve 20a, and after the start can be closed again when the associated engine 12 is situated in the other wing half.

Figure 3:
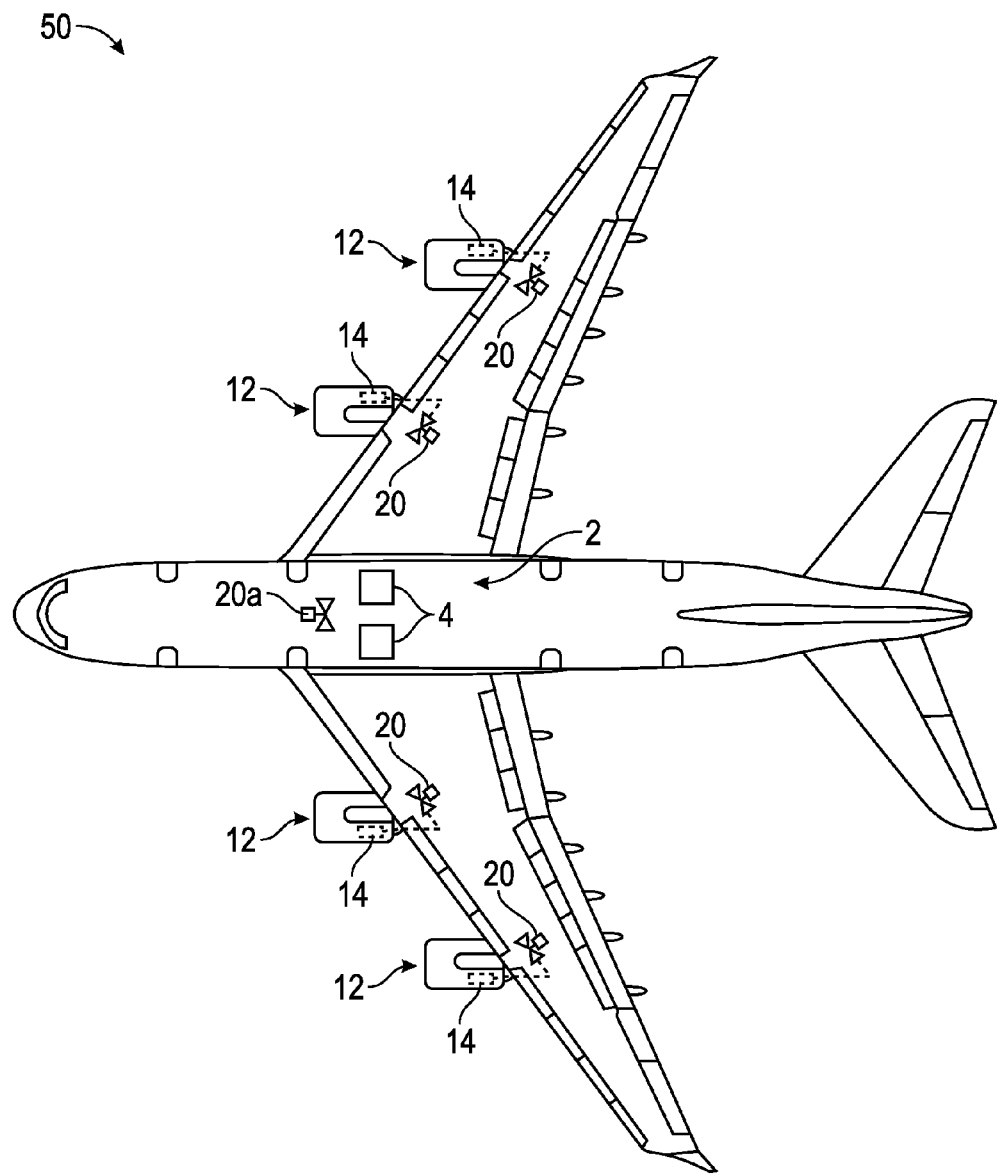
FIG. 3 shows a lateral view of an aircraft comprising an air conditioning system according to the various teachings of the present disclosure.

Finally, FIG. 3 shows a top view of an aircraft 50 that comprises the air conditioning system 2 according to the present disclosure. For the sake of simplicity only two air conditioning packs 4, four start valves 20, four starter turbines 14 and one valve for a connecting line 30 are shown. The arrangement of the components is to be interpreted as being merely one example. The start valves 20 can also have been installed directly on or in the air conditioning packs 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for starting engine of an aircraft, comprising:
closing an air conditioning valve that separates an outlet of a compressor of an air conditioning pack from a delivery air inlet for a cabin;
opening a start valve that connects the output of the compressor to a starter turbine;
starting the engine by conveying compressed air from the compressor to the starter turbine;
when the engine has reached an operating speed, closing the start valve;
opening the air conditioning valve; and
supplying bleed air from at least the engine to the compressor.

2. An engine start system for an aircraft, comprising:
an engine;
a starter turbine for the engine;
a compressed-air line connectable to a compressor of an air conditioning pack using an air cycle system;
at least one bleed air line connected to an inlet of the compressor to supply bleed air from at least the engine to the compressor;
an air conditioning valve for interrupting the connection between the compressed-air line and a cabin air supply, the air conditioning valve located on the compressed-air line between an outlet of the compressor and a delivery air inlet of the cabin air supply; and
a start valve for interrupting a connection between the compressed-air line and the starter turbine, the start valve located on the compressed air line between the outlet of the compressor and an inlet of the starter turbine,
wherein the air conditioning valve is closed and the start valve is opened to provide compressed air to the starter turbine to start the engine, and the start valve is closed and the air conditioning valve is opened based on the engine reaching an operating speed, with the bleed air supplied to the compressor after the engine is started.

3. The engine start system of claim 2, further comprising a pressure control valve positioned in the compressed-air line upstream of the starter turbine for limiting the pressure in the compressed-air line.

4. The engine start system of claim 2, further comprising an air conditioning pack for each fuselage side of the aircraft, wherein a compressed-air line each extends from a respective one of the air conditioning packs to an engine in the respective wing half, which engine is to be started.

5. The engine start system of claim 2, wherein a bleed air system of one or several engines is connected to the compressed-air line of the air conditioning pack.

6. The engine start system of claim 4, further comprising a valve for interrupting a connecting line between the compressed-air lines of the air conditioning packs.

7. An air conditioning system for an aircraft, comprising:
at least one air conditioning pack using an air cycle system, including a compressor and a compressed-air line connected to the compressor, and the compressed-air line is connectable to a starter turbine for an engine;
a start valve that feeds compressed air from the compressed-air line to the starter turbine, the start valve located on the compressed-air line between an outlet of the compressor and an inlet of the starter turbine;
at least one bleed air line connected to an inlet of the compressor to supply bleed air from at least the engine to the compressor; and
an air conditioning valve that channels compressed air from the compressed-air line to an intermediate cooling device for passing through the air cycle system for supplying the cabin, the air conditioning valve located on the compressed-air line between the outlet of the compressor and the intermediate cooling device for interrupting the connection between the compressed-air line and the intermediate cooling device, wherein the air conditioning valve is closed and the start valve is opened to provide compressed air to the starter turbine to start the engine and the start valve is closed and the air conditioning valve is opened based on the engine reaching an operating speed, with the bleed air supplied to the compressor after the engine is started.

8. The air conditioning system of claim 7, further comprising an air conditioning pack for each fuselage side of the aircraft, wherein a compressed-air line each extends from a respective one of the air conditioning packs to an engine in the respective wing half, which engine is to be started.

9. The air conditioning system of claim 8, wherein the compressed-air lines of the air conditioning packs to the starter turbines in the engines are interconnectable.

10. The air conditioning system of claim 7, wherein a bleed air system of one or several engines is connected to the compressed-air line of the air conditioning pack.

11. The air conditioning system of claim 9, further comprising a valve for interrupting a connecting line between the compressed-air lines of the air conditioning packs.

12. The air conditioning system of claim 7, further comprising a pressure control valve positioned in the compressed-air line upstream from the starter turbine for limiting the pressure in the compressed-air line.

\* \* \* \* \*